United States Patent
Wang et al.

(10) Patent No.: US 7,610,811 B1
(45) Date of Patent: Nov. 3, 2009

(54) METHOD AND SYSTEM FOR SENSING DIFFERENTIAL PRESSURE WITH ELASTOMER

(75) Inventors: Li Wang, Shanghai (CN); James Huang, Shanghai (CN)

(73) Assignee: Honeywell International Inc, Morristown, NJ (US)

( * ) Notice: Subject to any disclaimer, the term of this patent is extended or adjusted under 35 U.S.C. 154(b) by 0 days.

(21) Appl. No.: 12/250,290

(22) Filed: Oct. 13, 2008

(51) Int. Cl.
*G01L 9/12* (2006.01)
*G01L 7/08* (2006.01)

(52) U.S. Cl. .......................... 73/718; 73/715
(58) Field of Classification Search ....................... None
See application file for complete search history.

(56) References Cited

U.S. PATENT DOCUMENTS

| | | | |
|---|---|---|---|
| 3,269,174 A * | 8/1966 | Linville | 73/774 |
| 3,455,165 A * | 7/1969 | Huet | 73/727 |
| 4,485,157 A | 11/1984 | Moseley | |
| 5,597,020 A | 1/1997 | Miller et al. | |
| 6,062,538 A | 5/2000 | Nien | |
| 6,531,247 B1 * | 3/2003 | Yang | 429/211 |
| 6,959,911 B2 | 11/2005 | Strasser et al. | |
| 7,111,822 B2 | 9/2006 | Dornhoefer et al. | |
| 7,228,687 B2 | 6/2007 | Ehme | |
| 7,276,824 B2 * | 10/2007 | Statnikov et al. | 310/26 |
| 7,411,331 B2 | 8/2008 | Dubowsky et al. | |
| 7,469,714 B2 | 12/2008 | Müller | |

* cited by examiner

*Primary Examiner*—Andre J Allen
*Assistant Examiner*—Jermaine Jenkins
(74) *Attorney, Agent, or Firm*—Kris T. Fredrick

(57) ABSTRACT

A differential pressure sensor method and system includes a number of elastomer plates, which can be placed with certain distance and sealed in a small tube, wherein the tube can be connected to a number of detection areas. The surface of the elastomers can be covered with a thin film of conductive elastomer as a compliant electrode. The resistance of the compliant electrodes varies with deformation of the elastomer plates and the resistance change can be measured through circuits. A variable capacitor also exists between the elastomer plates due to a sealed space and the compliant electrodes. The elastomer plates deform accordingly when the pressure varies in the detection areas and the variation of the capacitance can be detected through circuits. The pressure difference between the detection areas can then be detected utilizing the variation in resistance and capacitance.

20 Claims, 6 Drawing Sheets

METHOD AND SYSTEM FOR SENSING DIFFERENTIAL PRESSURE WITH ELASTOMER

TECHNICAL FIELD

Embodiments are generally related to sensor methods and systems. Embodiments are also related to differential pressure sensors. Embodiments are additionally related to conductive elastomers for detecting pressure difference in flow systems.

BACKGROUND OF THE INVENTION

A pressure sensor detects pressure difference between detecting pressure and atmospheric pressure or fluid pressure and converts the detected pressure difference into an electric signal. The pressure sensor can be utilized to measure pressures of gases or liquids and possesses a wide range of applications such as flow systems in turbochargers and so forth. Pressure measurements typically are made as absolute, gauge or differential (or relative) measurements. A differential pressure sensor measures the differential measurements between two or more pressures, introduced as inputs to the sensing unit. For example, in gas turbocharger system the pressure difference between the two sides of oil seal needs to be detected for oil leakage prevention.

The majority of prior art differential pressure sensors possess a fixed or stationary electrode formed as a base for the sensing unit, and a dielectric material, which can be a fluid, supported thereon. A conductive outer plate, for example, may be movably mounted on the dielectric material and can be exposed to a pressure condition, which in some cases can cause the dielectric material to flex, with a corresponding change in the capacitance characteristic. Such differential pressure sensing systems are difficult to manufacture and can be easily contaminated by environmentally born dust and the like, resulting in some extreme cases, for example, in shorting of the system. In addition, leakage of a fluid dielectric in such sensors can also dramatically change the system characteristics. Additionally, such differential pressure sensors are too large to be embedded within very small flow systems for on-site monitoring. For example, in turbochargers applications where the total mounting area may be millimeter-sized, for both the sensor and the tube, the use of such conventional pressures is not appropriate. Moreover, such differential pressure sensors are too expensive to be embedded into vehicle turbochargers for oil leakage prevention.

Based on the foregoing, it is believed that a need exists for an improved method and system for sensing differential pressure with an elastomer. A need also exits for a low cost, miniaturized differential pressure sensor, which is capable of being embedded within a small flow system to detect a pressure difference, as described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved method and system for sensing differential pressure with an elastomer.

It is another aspect of the present invention to provide for an improved low cost, miniaturized differential pressure sensor, which is capable of being embedded in a small flow system for detecting a pressure difference.

The aforementioned aspects and other objectives and advantages can now be achieved as described herein. A differential pressure sensor can be configured to include a number of dielectric elastomer plates, which are capable of being located with a certain distance and sealed in a small tube, such that the tube can be connected to a number of detection areas. The surface of the dielectric elastomers can be covered with a thin film of elastomer as a compliant electrode. The resistance of the compliant electrodes varies with deformation of the elastomer plates and the resistance change can be measured through circuits. A variable capacitor also exists between the elastomer plates due to a sealed space and the compliant electrodes. The elastomer plates deform accordingly when the pressure varies in the detection areas and the variation of the capacitance can be detected through circuits. The pressure difference between the detection areas can then be detected utilizing the variation in resistance and capacitance.

The electrode pattern for capacitance detection and for resistance detection can be different from one another in order to improve the sensing accuracy. Electrical contacts, for example, can also be embedded within the tube walls in order to connect the compliant electrodes of the elastomer plates to external circuits. The elastomer plates can be embedded into the tube from both ends and then glued with the tube for sealing. The differential pressure sensor can be utilized in the turbocharger to prevent oil leakage by identifying the pressure difference between the detection areas. The detection areas can be assumed to connect with a compressor and an oil system of a center housing, respectively. The pressure connected to the compressor is generally higher than the pressure connected to the oil system of the center housing, for which the resulting pressure difference is preferably positive. Such a low-cost, miniaturized capsule-like differential pressure sensor with an elastomer is capable of being embedded in small flow systems where differential pressure is required to be detected.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
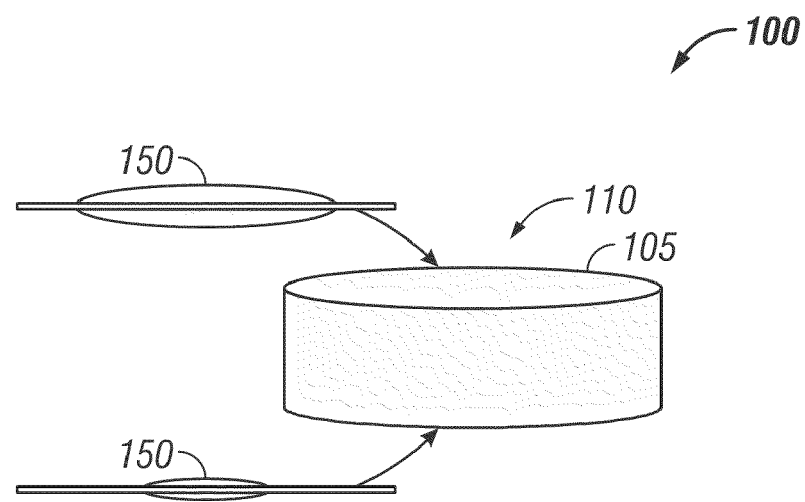
FIGS. 1-4 illustrate a method of forming a differential pressure sensor with elastomers, in accordance with a preferred embodiment.

The particular values and configurations discussed in these non-limiting examples can be varied and are cited merely to illustrate at least one embodiment and are not intended to limit the scope thereof.

FIGS. 1-4 illustrate a method 100 for forming a differential pressure sensor 200 with elastomers 110 and 120, in accordance with a preferred embodiment. An elastomer plate 105, which is dielectric in nature, can be molded or extruded into a certain size and shape. The elastomer material can be any type of dielectric elastomer with relatively low elastic modulus, such as silicone rubber, acrylic rubber, fluorine elastomer and the like. Thereafter, the compliant electrodes 150 can be coated or deposited onto the surface of the elastomer plate 105.

The compliant electrodes 150 can be patterned with metal thin films such as aluminum, gold, and the like through sputtering or evaporation deposition, or it can be conductive elastomer layers through spraying or spin coating and placed on elastomer plate 105 in order to form elastomers 110 and 120, as shown in FIG. 1. It can be appreciated, of course, that other types of materials may be utilized depending upon design considerations. The conductive elastomers can be manufactured by mixing conductive particles such as carbon black, with dielectric elastomer pre-compounds. Masks can also be utilized to prevent shortage between the two compliant electrodes 150 of elastomer plate 105.

Figure 2:
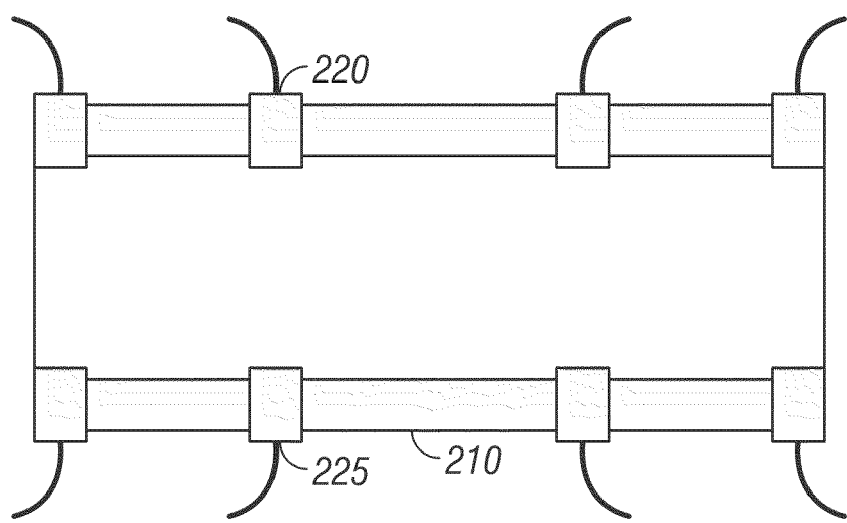
Figure 3:
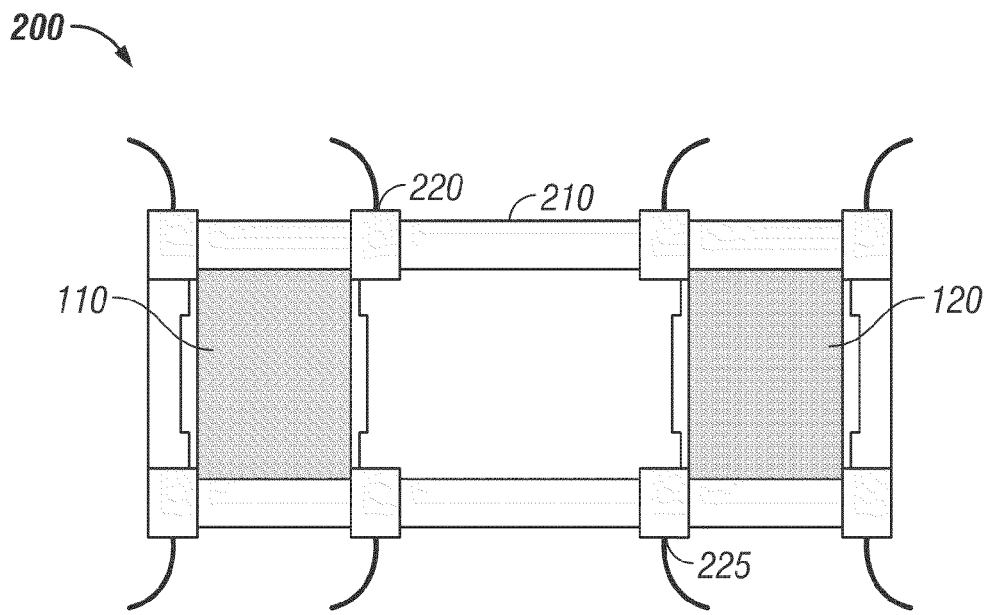
Figure 4:
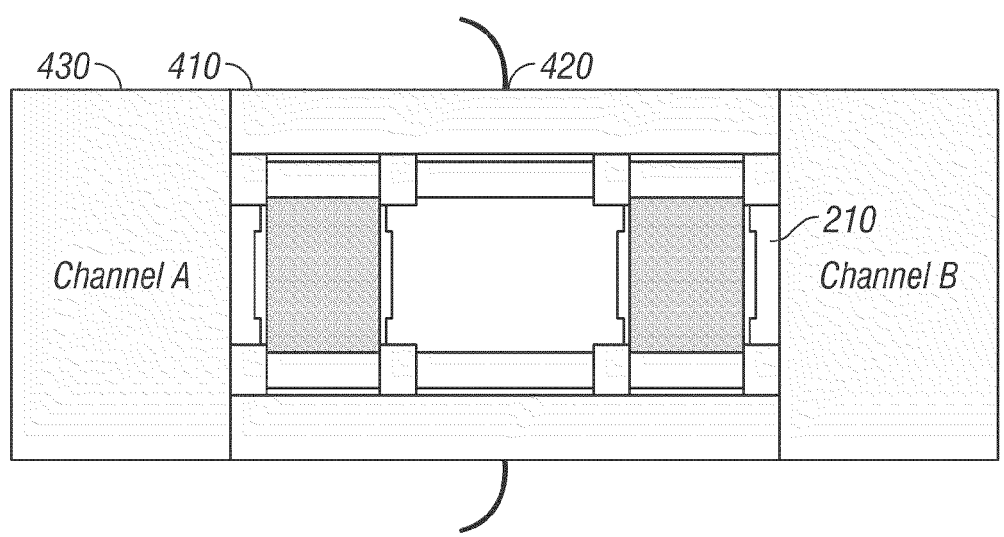

Next, as depicted in FIG. 2, a tube 210 can be prepared by utilizing a material, which can be non-conductive, such as glass, ceramic, plastic and the like. It can be appreciated, of course, that other types of materials may be utilized depending upon design considerations. Note that in FIGS. 1-10, identical or similar parts are generally indicated by identical reference numerals. A number of electrical contacts 220 and 225 can be embedded in walls of the tube 210, as shown in FIG. 2. The electrical contacts 220 and 225 can be connected with the compliant electrodes 150 and outside circuits 420 and 425, as shown in FIG. 4. Thereafter, as shown in FIG. 3, the elastomers 110 and 120 can be embedded and glued to (into and/or onto) the tube 210 from both ends in order to form a capsule-like differential pressure sensor 200. The pressure sensor 200 can be fitted to a flow tube 430 with a sealing 410 which separates two specific detection areas channel A and channel B in which the differential pressure needs to be detected.

Figure 5:
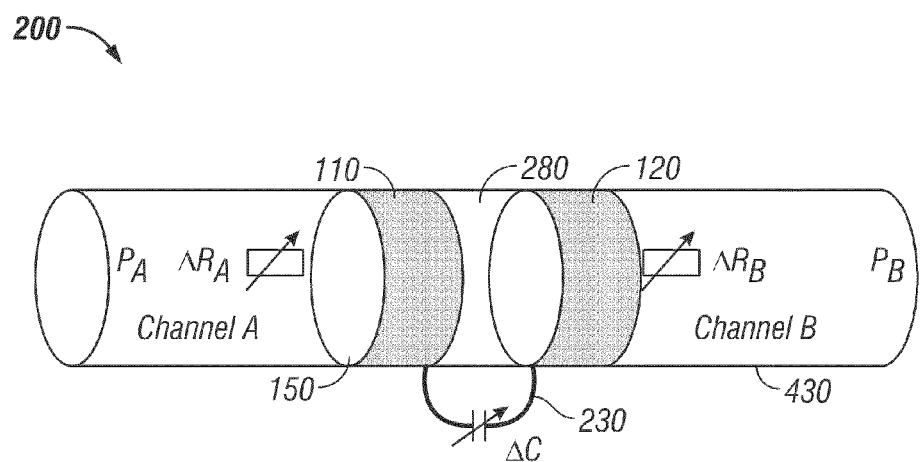
FIG. 5 illustrates a schematic diagram of a differential pressure sensor with elastomers, in accordance with a preferred embodiment.

FIG. 5 illustrates a schematic diagram of a differential pressure sensor 200 with elastomers 110 and 120, in accordance with the preferred embodiment. The capsule like differential pressure sensor 200 comprises a small glass tube 210 associated with elastomers 110 and 120. The elastomers 110 and 120 can be a polymer with the property of elasticity and can be reversibly extended from 5-700%, depending on the specific material. The surface of the elastomers 110 and 120 can be covered by the thin layer of conductive elastomers as the compliant electrodes 150. The pressure of channel A and channel B can be separated by the elastomers 110 and 120 and a certain volume gas is sealed in a sealed space 280 between the elastomers 110 and 120.

The surfaces of the elastomers 110 and 120 are covered by a thin layer of compliant electrodes 150 which change resistance ($\Delta R_A$, $\Delta R_B$) as the elastomers 110 and 120 deform with pressure variation between channel A and channel B. Such a resistance change ($\Delta R_A$ and $\Delta R_B$) in channel A and channel B can be measured utilizing circuits 420 and 425. Similarly, a capacitor 230 can also be configured between the compliant electrodes 150 of elastomers 110 and 120, which changes with the variation in pressure ($\Delta P$) between channel A and channel B. The combination of $\Delta C$, $\Delta R_A$, and $\Delta R_B$, can be monitored to obtain pressure difference $\Delta P$ between pressure $P_A$ and $P_B$. The pressure difference $\Delta P$ which can be the difference of the pressure $P_A$ in channel A and pressure $P_B$ in channel B can be written, as shown in equation (1).

$$\Delta P = P_A - P_B \tag{1}$$

Figure 6:
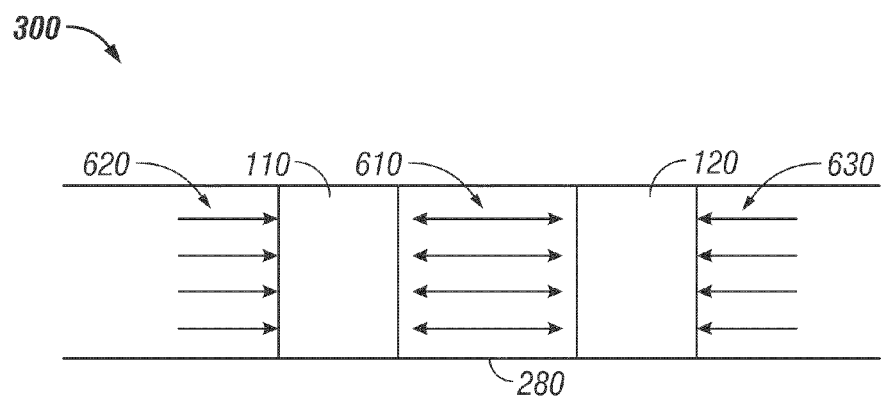
FIG. 6 illustrates a schematic view of the differential pressure sensor depicting pressure forces acting on the elastomers, in accordance with a preferred embodiment.

FIG. 6 illustrates a schematic view of the differential pressure sensor 200 depicting the pressure forces acting on elastomers 110 and 120, in accordance with the preferred embodiment. The differential pressure sensor 200 comprises different pressure forces 610, 620 and 630 acting on the compliant electrodes 150 associated with the elastomer 110 and 120. The compliant electrodes 150 can be exposed to different channel pressure 620 and 630 from channel A and channel B. The inner surface of the elastomers 110 and 120 can be exposed to sealed air pressure 610 on the sealed space 280. The workload is the different channel pressure 620 and 630 on the outer face of the elastomers 110 and 120 and the sealed air pressure 610 on the inner face of the elastomers 110 and 120. The channel pressure 620 and 630 is input, and the sealed air pressure 610 decides by the deformation of the elastomers 110 and 120.

Figure 7:
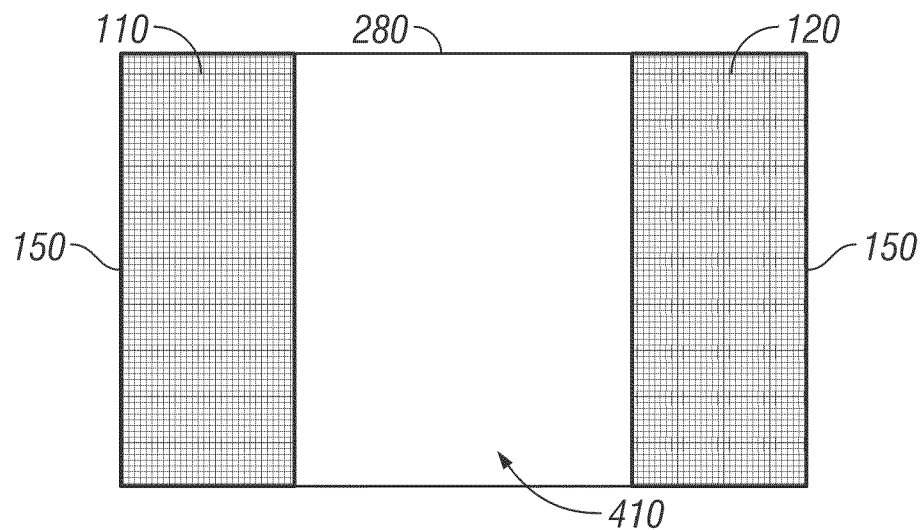
FIG. 7 illustrates an axial symmetry model of the elastomers, in accordance with the preferred embodiment.

FIG. 7 illustrates an axial symmetrical model of the differential pressure sensor 200, in accordance with a preferred embodiment. The elastomers 110 and 120 can be coated with the compliant electrodes 150. The sealed air 410 in the sealed space 280 can be calculated, as shown in equation (2):

$$P = P_o V_o / V \tag{2}$$

wherein P represents pressure 610 of the sealed air 410, V represents sealed volume, $P_o$ represent original pressure which can be of 1 atm in 25° c. and 1.587 atm at 200° c. and $V_o$ represents sealed volume.

Figure 8:
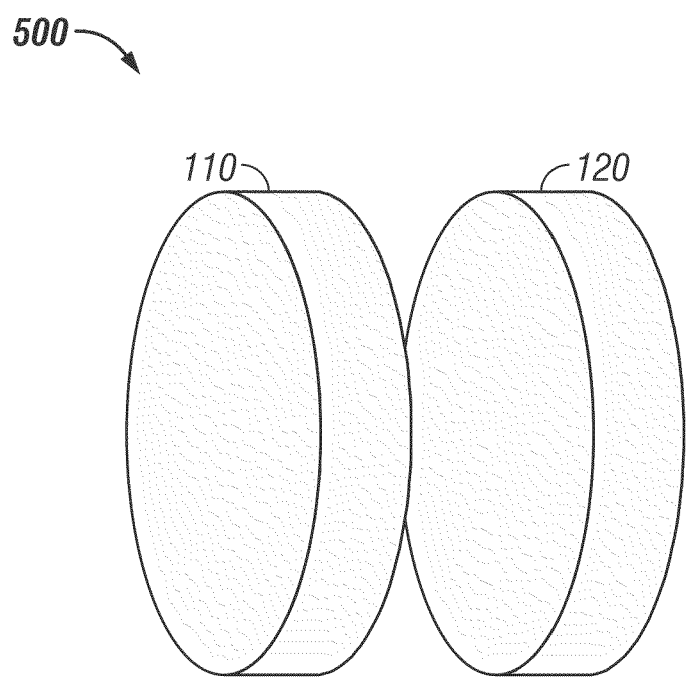
FIG. 8 illustrates a three dimensional view of the elastomers, in accordance with the preferred embodiment.
Figure 9:
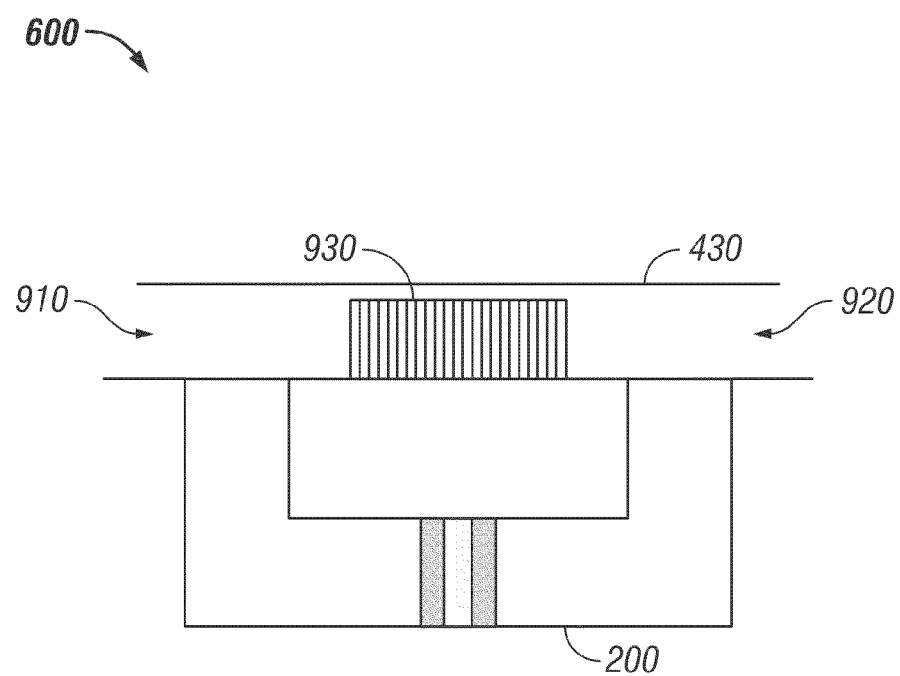
FIG. 9 illustrates a cut away side view of a turbocharger with the differential pressure sensor, which can be implemented in accordance with a preferred embodiment.

FIG. 8 illustrates a three-dimensional view 500 of elastomers 110 and 120, in accordance with a preferred embodiment. FIG. 9 illustrates a cut away side view of part of a turbocharger center housing 600, which can be implemented in accordance with a preferred embodiment. A seal 930 is implemented between compressor air volute 910 and oil channel 920. The sensor 200 is embedded in the flow tube 430 with separated channels A and B which connect to compressor air flow side and oil system side respectively. The differential pressure sensor 200 can be utilized in the turbocharger housing 600 in such above mentioned way to prevent oil leakage. The pressure in channel A can be higher than pressure in channel B. The differential pressure $\Delta P$ needs to be a positive value and in case of a negative value, a control system in the application can be warned.

The negative value of the $\Delta P$ can be obtained, for example, in situations involving the negative value of $\Delta C$, which may occur due to the increase in the distance of the capacitor 230 and the positive value of the $\Delta R$ (i.e., the absolute value of $\Delta R_A$ is larger than absolute value of $\Delta R_B$). Such a situation illustrates that the deformation of the elastomer 110 in channel A can be larger than the deformation of elastomer 120 in channel B. Another scenario involves the positive value of $\Delta C$, which can occur due to the distance of the capacitor 230, which can decrease, and a negative value of $\Delta R$ (i.e., absolute value of $\Delta R_A$ is smaller than the absolute value of $\Delta R_B$). Such a situation illustrates that the deformation of elastomer 110 in channel A can be smaller than the deformation in elastomer 120 in channel B. The electrode pattern for capacitance detection and for resistance may be different from one another in order to improve the sensing accuracy.

Figure 10:
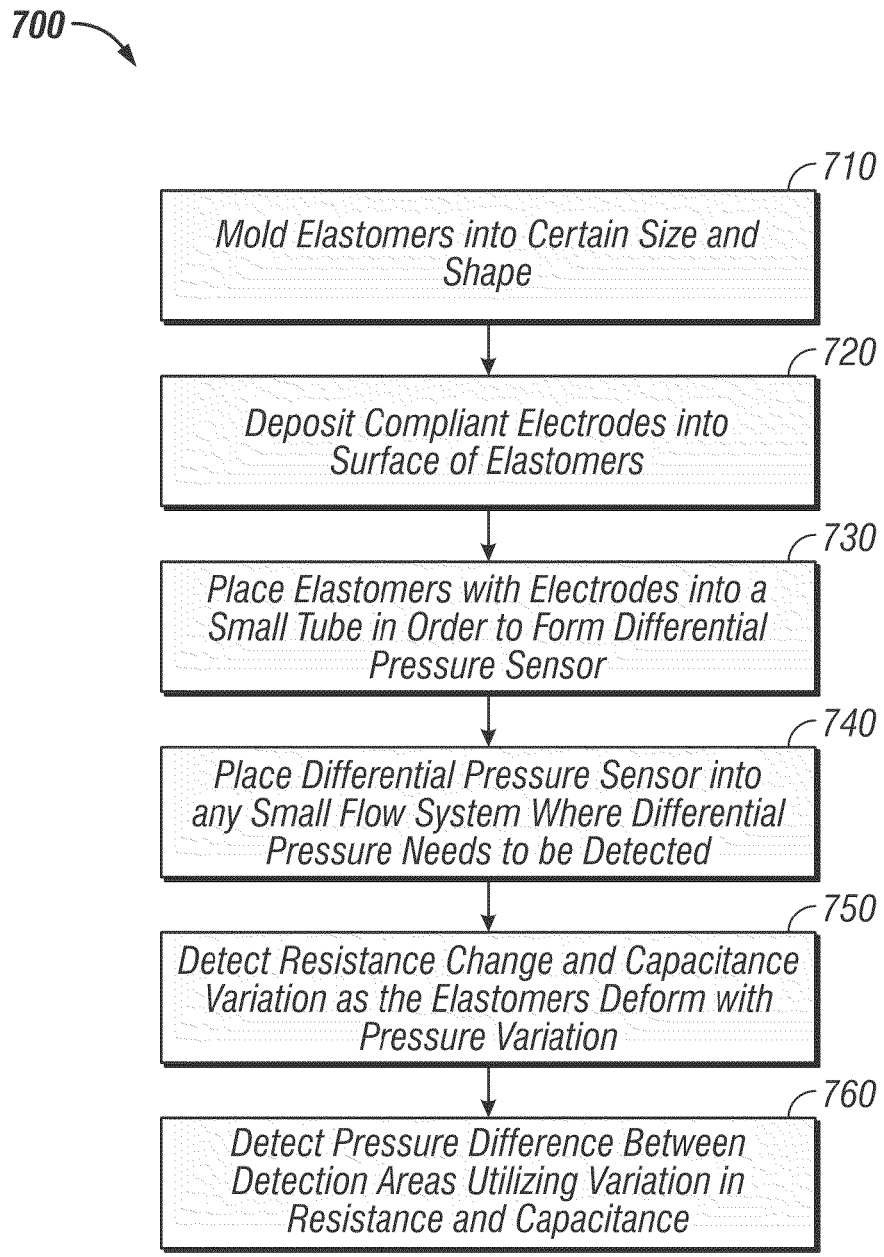
FIG. 10 illustrates a flow chart of operations illustrating logical operational steps of a method for detecting pressure difference utilizing a differential pressure sensor that incorporates elastomers, in accordance with a preferred embodiment.

FIG. 10 illustrates a flow chart of operations illustrating logical operational steps of a method 700 for detecting pressure difference utilizing the differential pressure sensor 200 with elastomers 110 and 120, in accordance with a preferred embodiment. Note that in FIGS. 1-10, identical or similar parts are generally indicated by identical reference numerals. The elastomer plates 105 can be molded or extruded into a certain size and shape, as depicted at block 710. Thereafter, the compliant electrodes 150 can be deposited or coated onto the surface of the elastomer plates 105 in order to form elastomers 110 and 120, as shown at block 720. Next, as illustrated at block 730, the elastomers 110 and 120 with compliant electrodes 150 can be placed into the small tube 210 in order to form differential pressure sensor 200. The differential pressure sensor 200 can be placed onto any flow systems where differential pressure needs to be detected, as shown at block 740. The resistance change and capacitance variation can be detected as the elastomers 110 and 120 deform with pressure variation, as illustrated at block 750. The pressure difference between detection areas (i.e., channel A and channel B) can be detected utilizing variation in resistance and capacitance, as depicted at block 760.

In above preferred embodiment, the Young's modulus of the elastomers 110 and 120 needs to be as small as possible, with recommended value of 1 Mpa. The Poisson ratio of the elastomers 110 and 120 can be, for example, 0.5, which means the elastomers remain constant volume under deformation.

The thermal expansion for the elastomers can be 5e-5 as a typical value of dielectric elastomers. Such a low cost, miniaturized differential pressure sensor 200 with elastomers 110 and 120 can be embedded in a small flow system to detect the pressure difference of specific two points. Hence, a tiny tube with tiny plates embedded can be placed into a flow system with very limited mounting space. The system described herein can also be configured in a large size for both the elastomer plate and the tube. A typical such application can monitor pressure for gas, or liquid, or mixed.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for detecting differential pressure, comprising:
    placing a plurality of elastomer plates in a particular distance within a tube and sealing a particular volume of gas between said plurality of elastomer plates, wherein said plurality of elastomer plates is covered with a compliant electrode and wherein said tube is capable of connection to a flow system in order to detect a pressure difference between a plurality of detection areas;
    detecting a change in a resistance and a capacitance associated with said plurality of elastomer plates and said compliant electrode when said plurality of elastomer plates deform with respect to a change in pressure between said plurality of detection areas; and
    monitoring said pressure difference between said plurality of detection areas utilizing said change in said resistance and said capacitance associated with said plurality of elastomer plates and said compliant electrode.

2. The method of claim 1 further comprising embedding a plurality of electrical contacts in walls of said tube that connect to said compliant electrode, wherein said compliant electrode is associated with said plurality of elastomer plates and a plurality of external circuits.

3. The method of claim 1 wherein said plurality of elastomer plates covered with said compliant electrode is capable of being shaped into a micro-sized component.

4. The method of claim 1 wherein said plurality of elastomer plates covered with said compliant electrode is capable of being shaped into a macro-sized component.

5. The method of claim 1 further comprising:
    configuring a differential pressure sensor to include said plurality of elastomer plates and said compliant electrode.

6. The method of claim 5 further comprising:
    connecting said differential pressure sensor to a turbocharger center housing to prevent oil leakage.

7. The method of claim 1 wherein said plurality of elastomer plates covered with said compliant electrode comprises an elastomer with a relatively low elastic modulus.

8. The method of claim 1 further comprising determining a negative value of said pressure difference utilizing a negative value of said change in said capacitance due to an increase in a distance of an associated capacitor and a positive value associated with said change in said resistance.

9. The method of claim 1 further comprising determining a negative value of said pressure difference utilizing a positive value of said change in said capacitance due to a decrease in a distance of an associated capacitor and a negative value associated with said change in said resistance.

10. A method for detecting differential pressure, comprising:
    placing a plurality of elastomer plates in a particular distance within a tube and sealing a particular volume of gas between said plurality of elastomer plates, wherein said plurality of elastomer plates is covered with a compliant electrode and wherein said tube is capable of connection to a flow system in order to detect a pressure difference between a plurality of detection areas;
    detecting a change in a resistance and a capacitance associated with said plurality of elastomer plates and said compliant electrode when said plurality of elastomer plates deform with respect to a change in pressure between said plurality of detection areas;
    monitoring said pressure difference between said plurality of detection areas utilizing said change in said resistance and said capacitance associated with said plurality of elastomer plates and said compliant electrode; and
    embedding a plurality of electrical contacts in walls of said tube that connect to said compliant electrode, wherein said compliant electrode is associated with said plurality of elastomer plates and a plurality of external circuits.

11. The method of claim 10 further comprising:
    configuring a differential pressure sensor to include said plurality of elastomer plates and said compliant electrode.

12. The method of claim 11 further comprising:
    connecting said differential pressure sensor to a turbocharger center housing to prevent oil leakage.

13. The method of claim 10 wherein said plurality of elastomer plates covered with said compliant electrode comprises an elastomer with a relatively low elastic modulus.

14. A system for detecting differential pressure, comprising:

a plurality of elastomer plates located in a particular distance within a tube, wherein a particular volume of gas is sealed between said plurality of elastomer plates, a compliant electrode that covers said plurality of elastomer plates, such said tube is capable of connection to a flow system in order to detect a pressure difference between a plurality of detection areas;

a detector for detecting a change in a resistance and a capacitance associated with said plurality of elastomer plates and said compliant electrode when said plurality of elastomer plates deform with respect to a change in pressure between said plurality of detection areas; and a monitor for monitoring said pressure difference between said plurality of detection areas utilizing said change in said resistance and said capacitance associated with said plurality of elastomer plates and said compliant electrode.

15. The system of claim 14 further comprising a plurality of electrical contacts embedded in walls of said tube that connect to said compliant electrode, wherein said compliant electrode is associated with said plurality of elastomer plates and a plurality of external circuits.

16. The system of claim 14 further comprising:
a differential pressure sensor configured to include said plurality of elastomer plates and said compliant electrode.

17. The system of claim 16 wherein said differential pressure sensor is connected to a turbocharger center housing to prevent oil leakage.

18. The system of claim 14 wherein said plurality of elastomer plates covered with said compliant electrode comprises an elastomer with a relatively low elastic modulus.

19. The system of claim 14 wherein said compliant electrode comprises a patterned metal thin film.

20. The system of claim 14 wherein said compliant electrode comprises a conductive elastomer film.

* * * * *